United States Patent
Tao et al.

(10) Patent No.: US 11,710,307 B2
(45) Date of Patent: Jul. 25, 2023

(54) URBAN REMOTE SENSING IMAGE SCENE CLASSIFICATION METHOD IN CONSIDERATION OF SPATIAL RELATIONSHIPS

(71) Applicant: Central South University, Changsha (CN)

(72) Inventors: Chao Tao, Changsha (CN); Weipeng Lu, Changsha (CN); Ji Qi, Changsha (CN); Haifeng Li, Changsha (CN)

(73) Assignee: CENTRAL SOUTH UNIVERSITY, Changsha (CN)

(*) Notice: Subject to any disclaimer, the term of this patent is extended or adjusted under 35 U.S.C. 154(b) by 365 days.

(21) Appl. No.: 17/168,580

(22) Filed: Feb. 5, 2021

(65) Prior Publication Data

US 2021/0264150 A1 Aug. 26, 2021

(30) Foreign Application Priority Data

Feb. 26, 2020 (CN) .......................... 202010118553.2

(51) Int. Cl.
*G06V 20/10* (2022.01)
*G06N 3/04* (2023.01)
(Continued)

(52) U.S. Cl.
CPC .......... *G06V 20/176* (2022.01); *G06F 18/217* (2023.01); *G06F 18/2134* (2023.01);
(Continued)

(58) Field of Classification Search
CPC .. G06V 20/176; G06V 10/32; G06V 10/7515; G06V 10/7715; G06V 10/776;
(Continued)

(56) References Cited

U.S. PATENT DOCUMENTS

| | | | |
|---|---|---|---|
| 8,037,010 B2 * | 10/2011 | Jaros | G06N 3/049 706/62 |
| 2020/0065968 A1 * | 2/2020 | Sargent | G06F 18/24 |

OTHER PUBLICATIONS

Liu et al., Learning Multiscale Deep Features for High-Resolution Satellite Image Scene Classification, IEEE Transactions on Geoscience and Remote Sensing, Jan. 2018, pp. 117-126, vol. 56, No. 1.
(Continued)

*Primary Examiner* — Juan A Torres
(74) *Attorney, Agent, or Firm* — WPAT, P.C

(57) ABSTRACT

An urban remote sensing image scene classification method in consideration of spatial relationships is provided and includes following steps of: cutting a remote sensing image into sub-images in an even and non-overlapping manner; performing a visual information coding on each of the sub-images to obtain a feature image Fv; inputting the feature image Fv into a crossing transfer unit to obtain hierarchical spatial characteristics; performing convolution of dimensionality reduction on the hierarchical spatial characteristics to obtain dimensionality-reduced hierarchical spatial characteristics; and performing a softmax model based classification on the dimensionality-reduced hierarchical spatial characteristics to obtain a classification result. The method comprehensively considers the role of two kinds of spatial relationships being regional spatial relationship and long-range spatial relationship in classification, and designs three paths in a crossing transfer unit for relationships fusion, thereby obtaining a better urban remote sensing image scene classification result.

6 Claims, 2 Drawing Sheets

(51) Int. Cl.
| | |
|---|---|
| *G06N 3/08* | (2023.01) |
| *G06F 18/21* | (2023.01) |
| *G06F 18/2134* | (2023.01) |
| *G06V 10/75* | (2022.01) |
| *G06V 10/77* | (2022.01) |
| *G06V 10/776* | (2022.01) |
| *G06V 10/80* | (2022.01) |
| *G06V 10/32* | (2022.01) |
| *G06V 20/13* | (2022.01) |

(52) U.S. Cl.
CPC .............. *G06N 3/04* (2013.01); *G06N 3/08* (2013.01); *G06V 10/32* (2022.01); *G06V 10/7515* (2022.01); *G06V 10/776* (2022.01); *G06V 10/7715* (2022.01); *G06V 10/806* (2022.01); *G06V 20/13* (2022.01)

(58) Field of Classification Search
CPC .. G06V 10/806; G06V 20/13; G06F 18/2134; G06F 18/217; G06F 18/253; G06F 18/241; G06F 18/2415; G06N 3/04; G06N 3/08; G06N 3/045; G06N 3/044; G06N 3/084; G06N 3/047
USPC ........................................................ 382/157
See application file for complete search history.

(56) References Cited

OTHER PUBLICATIONS

Cheng et al., When Deep Learning Meets Metric Learning: Remote Sensing Image Scene Classification via Learning Discriminative CNNs, IEEE Transactions on Geoscience and Remote Sensing, 2018, pp. 1-11.

Visin et al. ReNet: A Recurrent Neural Network Based Alternative to Convolutional Networks, arXiv preprint arXiv:1505.003933, Jul. 23, 2015, pp. 1-9.

He et al., Deep Residual Learning for Image Recognition, CVPR paper provided by the Computer Vision Foundation, 2016, pp. 770-778.

Chollet F, Xception: Deep Learning with Depthwise Separable Convolutions, CVPR paper provided by the Computer Vision Foundation, 2017, pp. 1251-1258.

* cited by examiner

URBAN REMOTE SENSING IMAGE SCENE CLASSIFICATION METHOD IN CONSIDERATION OF SPATIAL RELATIONSHIPS

TECHNICAL FIELD

The invention relates to the field of remote sensing image analysis and deep learning technologies, and particularly to a scene classification method of large-scale and high-resolution remote sensing images, and more particularly to an urban remote sensing image scene classification method in consideration of spatial relationships.

DESCRIPTION OF RELATED ART

With the continuous increasing of remote sensing image resolution, an image analysis has moved from pixel-oriented and object-oriented stages to a scene-oriented stage. Accurate extraction and classification of urban scenes play an important role in urban planning, transportation, etc. Since 2012, with the rapid development of deep learning in digital image processing, many domestic and foreign researchers have begun to combine deep learning technology with remote sensing image analysis and classification. For example, Liu et al. have proposed an SPP-Net+MKL model by introducing a multi-level pyramid structure into a convolutional neural network, which realizes multiscale remote-sensing image analysis (Reference document: LIU Q, HANG R, SONG H, et al. 2018, Learning multiscale deep features for high-resolution satellite image scene classification, IEEE Transactions on Geoscience and Remote Sensing [J], Vol. 56: 117-126); and Cheng et al. have proposed a discriminative CNNs model by designing a special loss function, which realizes the analysis of different remote sensing image scenes being visually similar to each other (Reference document: CHENG G, YANG C, YAO X, et al. 2018, When deep learning meets metric learning: Remote sensing image scene classification via learning discriminative CNNs, IEEE Transactions on Geoscience and Remote Sensing [J]). Unlike natural pictures, remote sensing images have more abundant spatial relationships. Since there is almost no spatial relationship between natural images, deep learning models based on natural image analysis cannot model the spatial relationships for analysis, and at the same time, relationships between images are often discarded when building a data set for model training, which make the performance of deep learning model on remote sensing images is inferior to its performance on natural images.

SUMMARY

Accordingly, an objective of the invention is to provide an urban remote sensing image scene classification method in consideration of spatial relationships, and the method of the invention takes two types of spatial relationships in consideration, i.e., regional spatial relationship and long-range spatial relationship, so as to achieve a better urban remote sensing image scene classification result.

The objective of the invention is embodied in a way including following steps:

step 1, cutting a remote sensing image into sub-images in an even and non-overlapping manner;

step 2, performing a visual information coding on each of the sub-images to obtain a feature image Fv;

step 3, inputting the feature image Fv into a crossing transfer unit to obtain hierarchical spatial characteristics;

step 4, performing convolution of dimensionality reduction on the hierarchical spatial characteristics to obtain dimensionality-reduced hierarchical spatial characteristics; and step 5, performing a softmax model based classification on the dimensionality-reduced hierarchical spatial characteristics to obtain a classification result.

Moreover, the cutting process in the step is that: a large-scale remote sensing image I with a size of M×N is sliding cut into m×n sub-images in the even and non-overlapping manner, each of the sub-images $P_{i,j}$ is with a size of $$\frac{M}{m} \times \frac{N}{n},$$

row and column numbers (i, j) of the $P_{i,j}$ in the I are stored as spatial information, where M, N, m and n are positive integers, $1 \leq i \leq m$, and $1 \leq j \leq n$.

For the visual information coding in the step 2, a pre-trained deep convolution model is used to perform the visual information coding on each of the sub-images $P_{i,j}$ to convert the $P_{i,j}$ into a vector $fv_{i,j}$ and thereby the large-scale remote sensing image I is converted into the feature image Fv:

$$Fv = \begin{pmatrix} fv_{1,1} & \cdots & fv_{1,n} \\ \vdots & \ddots & \vdots \\ fv_{m,1} & \cdots & fv_{m,n} \end{pmatrix}.$$

The crossing transfer unit is used for extraction and fusion of regional spatial relationship and long-range spatial relationship, an extraction formula of the regional spatial relationship is Fr=Conv(Fv)=Fv*W+b, where Fr represents spatial relationship as extracted for analysis, Conv( ) represents a convolution function, W represents a convolution kernel, B represents an offset, and * represents a convolution operation; and the long-range spatial relationship is extracted by a ReNet module based on a recurrent neural network.

In a preferred embodiment, an input of the crossing transfer unit is the feature image Fv, and an output of the crossing transfer unit is the hierarchical spatial characteristics $F_E$; the crossing transfer unit uses three paths to extract relationships for analysis and transfer relationships, a first one of the three paths first extracts the regional spatial relationship of the Fv and then extracts the long-range spatial relationship, a second one of the three paths is reversed and first extracts the long-range spatial relationship of the Fv and then extracts the regional spatial relationship, and a third one of the three paths is a shortcut to transfer the Fv directly to a tail end of the crossing transfer unit without additional processing; and the hierarchical spatial characteristics $F_E$ as output is expressed to be that:

$F_E$=tanh(ReNet²(Conv¹(Fv)+Conv²(ReNet¹(Fv))+Fv), where tanh represents a hyperbolic tangent function, ReNet¹ and ReNet² represent two ReNet modules with different parameters, Conv¹ and Conv² represent two convolution modules with different parameters.

In a preferred embodiment, in the step 3, the feature image passes through three crossing transfer units in series to obtain hierarchical spatial characteristics $F_M$; in the step 4, a convolutional layer $conv_{1\times1}$, with a size of 1×1 is used for the convolution of dimensionality reduction; and in the step 5, a softmax model is used for the classification, and the classification result $C_{i,j}$ for the $P_{i,j}$ is expressed as that:

$$C_{i,j}=\mathrm{argmax}(\mathrm{softmax}(\mathrm{conv}_{1\times 1}(F_M)_{i,j})),$$

where argmax(x) represents a dimension corresponding to a maximum component of a vector x.

In a preferred embodiment, the ReNet module is used for extracting the long-range spatial relationship from four directions of up, down, left and right along rows and columns of pixels for analysis.

Aiming at conventional remote sensing image analysis methods cannot analyze the spatial relationships among images, the method of the invention designs a model that can extract and analyze the spatial relationships among different images, and the model can be roughly divided into two parts: visual information extraction and coding part and spatial relationships fusion part. The method of the invention can realize better scene classification of remote sensing images, such as the distinction among commercial, industrial, residential, and institutional lands in the remote sensing images.

DETAILED DESCRIPTION OF EMBODIMENTS

The invention will be further described below in conjunction with embodiments and the drawings, but will not be limited in any way. Any modifications or substitutions made based on the teachings of the invention shall fall within the protection scope of the invention.

Aiming at conventional remote sensing image analysis methods that cannot analyze the spatial relationships among images, a model that can extract and analyze the spatial relationships among different images is designed, and the model can be roughly divided into two parts: visual information extraction and coding part, and spatial relationships fusion part. The method of the invention can achieve better scene classification of remote sensing images, such as the distinction of commercial, industrial, residential and institutional lands in the remote sensing images.

Figure 1:
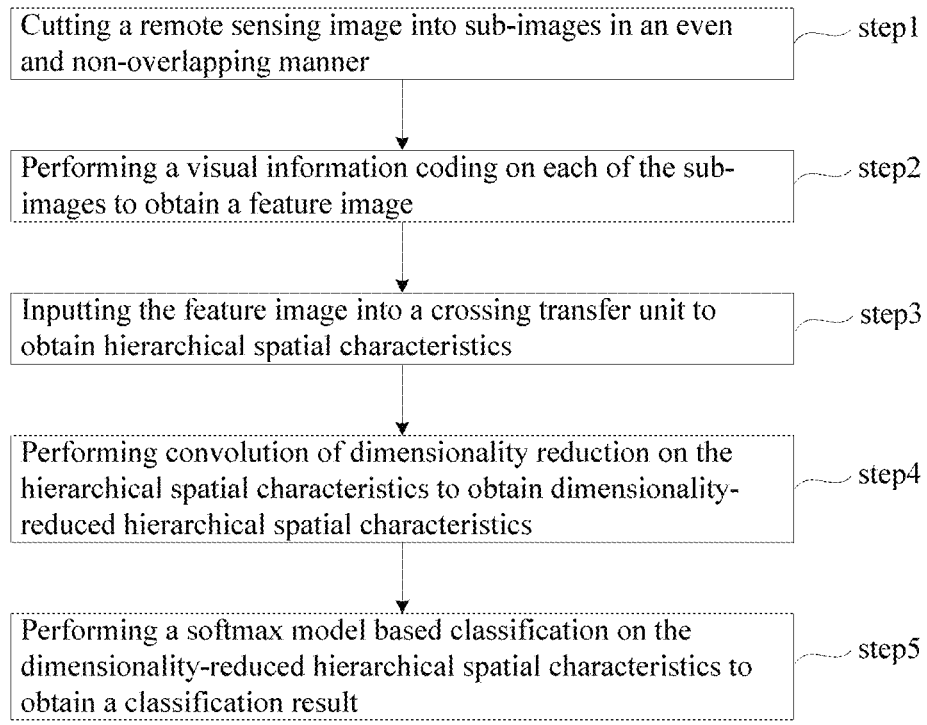
FIG. 1 is a schematic flowchart of the method of the invention.

Referring to FIG. 1, an embodiment of the invention includes the following steps of:

step 1, cutting a remote sensing image into sub-images in an even and non-overlapping manner;

step 2, performing a visual information coding on each of the sub-images to obtain a feature image Fv;

step 3, inputting the feature image Fv into a crossing transfer unit to obtain hierarchical spatial characteristics;

step 4, performing convolution of dimensionality reduction on the hierarchical spatial characteristics to obtain dimensionality-reduced hierarchical spatial characteristics; and step 5, performing a softmax model based classification on the dimensionality-reduced hierarchical spatial characteristics to obtain a classification result.

In the step 1, as to the illustrated embodiment, in order to retain spatial relationships in the remote sensing image, a large-scale remote sensing image I with a size of M×N is sliding cut into m×n sub-images in the even and non-overlapping manner, each sub-image $P_{i,j}$ has a size of $M/m \times N/n$, where the row and column numbers (i, j) of the $P_{i,j}$ in the I are stored as spatial information, where M, N, m and n are positive integers, $1 \leq i \leq m$, and $1 \leq j \leq n$.

In the step 2, for each sub-image $P_{i,j}$ a visual information coding operation is applied thereto by using a pre-trained deep convolution model, so that the $P_{i,j}$ is converted into a vector $fv_{i,j}$ and finally the I is converted into a feature image Fv:

$$Fv = \begin{pmatrix} fv_{1,1} & \cdots & fv_{1,n} \\ \vdots & \ddots & \vdots \\ fv_{m,1} & \cdots & fv_{m,n} \end{pmatrix}, fv_{i,j} \in R^c \quad \text{formula (1)}$$

After the Fv is obtained, each $fv_{i,j}$ may be treated as a pixel, so that the classification problem of $P_{i,j}$ in the I is transformed into a semantic segmentation problem of Fv. Considering that a distribution of scenes has planar distribution (airport, residential area, etc.) and linear distribution (road, river, etc.), the illustrated embodiment mainly considers two kinds of spatial relationships when considering spatial relationships, i.e., regional spatial relationship and long-range spatial relationship. Modelings of spatial relationships include the following three aspects.

Aspect 1, regional spatial relationship modeling

For the Fv, the regional spatial relationship may be understood as a relationship between $fv_{i,j}$ and a vector in a certain neighborhood area thereof. A convolutional neural network model can extract and fuse relationships in a certain neighborhood area through convolution operation, so as to achieve the purpose of regional spatial relationship modeling. Therefore, the method of the invention will adopt the convolution model in the analysis of regional spatial relationship. Assuming that W represents a convolution kernel, B represents an offset, and Fr represents spatial relationship as extracted for analysis, then a one-layer convolution model can be expressed as:

$$Fr=\mathrm{Conv}(Fv)=Fv*W+b \quad \text{formula (2)}$$

where the asterisk (*) indicates a convolution operation.

Aspect 2, long-range spatial relationship modeling

Figure 2:
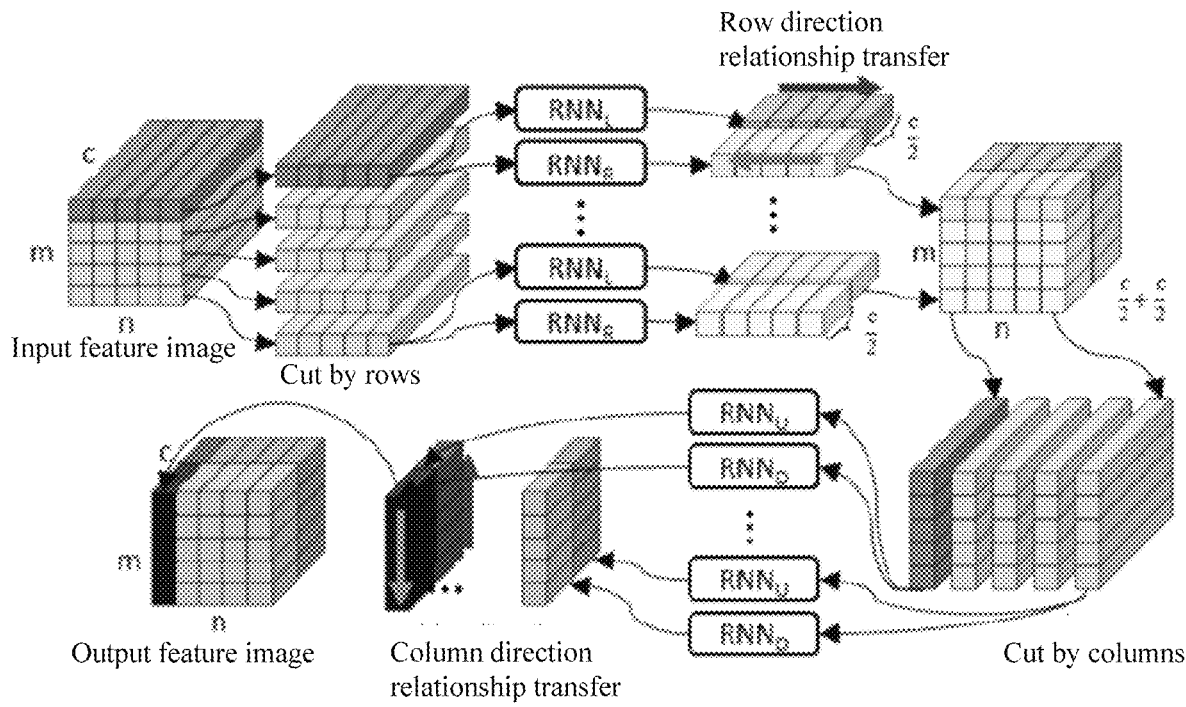
FIG. 2 is a schematic structural diagram of a ReNet module according to an embodiment of the invention.

A structural diagram of a ReNet module is shown in FIG. 2, for the Fv, the long-range spatial relationship can be understood as a relationship between $fv_{i,j}$ and vectors of row and column thereof. A recurrent neural network has a wide range of applications in sequence models, and its special stage information processing structure can comprehensively analyze context information. Considering that fv in the same row or in the same column can be treated as a sequential data, and thus the illustrated embodiment introduces the ReNet module based on recurrent neural network. The ReNet module can extract and analyze long-range spatial relationship from four directions of up, down, left and right along directions of row and column of pixels. Experiments show that its performance on some public data can reach the level of convolutional neural networks (Reference document: VISIN F, KASTNER K, CHO K, et al., ReNet: A Recurrent Neural Network Based Alternative to Convolutional Networks [J], arXiv preprint arXiv:1505.00393, 2015).

Aspect 3, spatial relationship fusion modeling

Figure 3:
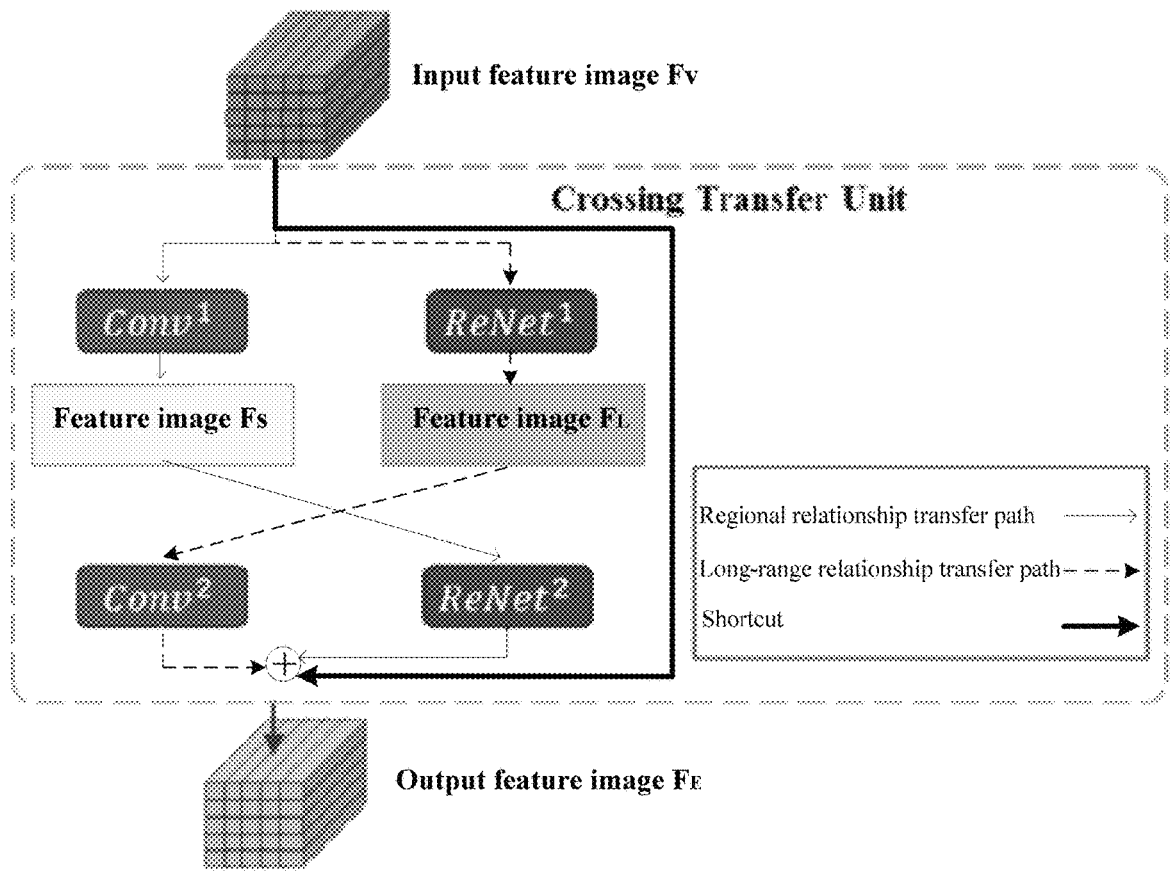
FIG. 3 is a schematic structural diagram of a crossing transfer unit according to an embodiment of the invention.

A structural diagram of a crossing transfer unit is shown in FIG. 3, ⊕ represents addition, the illustrated embodiment designs the crossing transfer unit (CTU) to realize a fusion of the regional spatial relationship with the long-range spatial relationship. CTU uses feature images as input (Fv) and output ($F_E$), and adopts three paths for relationships extraction (for analysis) and transfer. A first path first extracts the regional spatial relationship of Fv and then extracts the long-range spatial relationship; a second path is reversed, i.e., first extracts the long-range spatial relationship of Fv and then extracts the regional spatial relationship; and a third path is a shortcut to transfer FV directly to a tail end of CTU without additional processing. Experiments show that adding a direct transfer path can speed up a convergence speed of the model (Reference document: He K, Zhang X, Ren S, et al. Deep residual learning for image recognition [C] Proceedings of the IEEE conference on computer vision and pattern recognition, 2016:770-778). A final output result $F_E$ may be expressed as that:

$$F_E = \tanh(ReNet^2(Conv^1(Fv)) + Conv^2(ReNet^1(Fv)) + Fv) \quad \text{formula (3)}$$

where tanh is a hyperbolic tangent function, $ReNet^1$ and $ReNet^2$ represent two ReNet modules with different parameters, $Conv^1$ and $Conv^2$ represent two convolution modules with different parameters.

After passing through three CTUs in series, a result of the modelings of spatial relationships is recorded as $F_M$. The illustrated embodiment uses a convolutional layer $conv_{1 \times 1}$ with a size of 1×1 to perform convolution of dimensionality reduction on $F_M$, and uses softmax model to perform classification, and finally a classification result $C_{i,j}$ for $P_{i,j}$ can be expressed as that:

$$C_{i,j} = \text{argmax}(\text{softmax}(conv_{1 \times 1}(F_M)_{i,j})) \quad \text{formula (4)}$$

where argmax(x) represents a dimension corresponding to a maximum component of a vector x.

Figure 4:
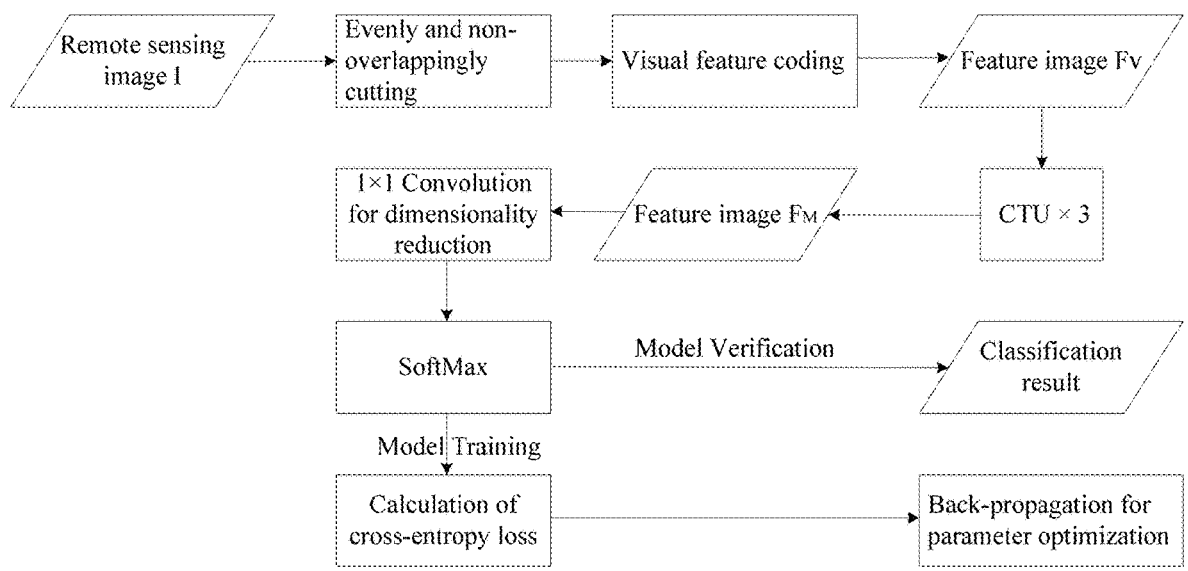
FIG. 4 is a schematic flowchart of a data processing according to an embodiment of the invention.

In a training process of the softmax model, a loss function is cross-entropy loss, and a back-propagation method is used to optimize parameters of model. A basis flowchart of data processing is shown in FIG. 4.

A data set used in an experiment is a CSU-RESISC10 data set, and a distribution of training and testing samples of the data set after preprocessing is shown in Table 1.

2048-dimensional vector $fv_{i,j}$. Finally, the I is converted into a feature image $Fv \in R^{20 \times 20 \times 2048}$. In order to reduce the amount of calculation, before proceeding to the next calculation, a convolution with a size of 1×1 is used to reduce the Fv to 512 dimensions.

A pre-training is carried out with 50 batches, a learning rate is $10^{-5}$ and an attenuation rate is 0.98, a result of the pre-training can refer to the first data row of Table 2 below.

During modeling the spatial relationships, the embodiment of the invention keeps sizes of all output feature images and input feature images unchanged by adding edge compensation and controlling convolution kernel compensation. In order to fully extract the spatial relationship of $fv_{i,j}$, the illustrated embodiment of the invention uses three CTU modules to progressively extract hierarchical spatial characteristics. A final output of the spatial relationship modelings is $F_M \in R^{20 \times 20 \times 512}$.

The illustrated embodiment finally carries out classification as per the above formula (4).

The cross-entropy is used as the loss function in the model training, the model of the illustrated embodiment of the invention is trained with 100 batches, the learning rate is $10^{-5}$ and the attenuation rate is 0.98. After training about 15 batches, the model converges.

In order to verify an effectiveness of the invention, in addition to the illustrated embodiment, SPP-Net+MKL, Discriminative CNNs and a traditional natural image classification model Xception (Reference document: Chollet F, Xception: Deep learning with depthwise separable convolutions [C] Proceedings of the IEEE conference on computer vision and pattern recognition, 2017: 1251-1258) are additionally selected as comparisons. Classification experiments are carried out on the CSU-RESISC10 data set, and F1 score and Kappa coefficient ($\kappa$) are selected as evaluation basis.

TABLE 1

| Scene Classes | Road | Commercial Area | Industrial Area | Residential Area | Construction Land | Institutional Land | Port | Waters | Public Place | Airport |
|---|---|---|---|---|---|---|---|---|---|---|
| Test set | 17129 | 6768 | 1588 | 39806 | 530 | 1948 | 5331 | 12304 | 11587 | 3009 |
| Validation set | 2480 | 512 | 506 | 5728 | 22 | 386 | 665 | 1765 | 2642 | 494 |

For each piece of 2000×2000 remote sensing image I in the CSU-RESISC10 data set, it first is cut into 20×20 numbers of sub-images $P_{i,j}$ in an even and non-overlapping manner, and each the sub-image is with a size of 100×100.

TABLE 2

| | F1 score | | | | | | | | | | |
|---|---|---|---|---|---|---|---|---|---|---|---|
| Methods | Road | Commercial Area | Industrial Area | Residential Area | Constsuction Land | Institutional Land | Port | Waters | Public Place | Airport | $\kappa$ |
| Xception | 0.8131 | 0.3922 | 0.3541 | 0.8640 | 0.3793 | 0.2838 | 0.8615 | 0.9380 | 0.8340 | 0.8421 | 0.7638 |
| SPP-Net-MKL | 0.8133 | 0.4293 | 0.4680 | 0.8734 | 0.3750 | 0.1746 | 0.8265 | 0.9109 | 0.8260 | 0.8566 | 0.7624 |
| Discriminative CNNs | 0.8434 | 0.3723 | 0.4912 | 0.8802 | 0.4000 | 0.2639 | 0.8239 | 0.9273 | 0.8422 | 0.8057 | 0.7731 |
| the invention | 0.8329 | 0.6030 | 0.7643 | 0.9014 | 0.4400 | 0.6218 | 0.9239 | 0.9598 | 0.8841 | 0.9648 | 0.8410 |

For each the sub-image $P_{i,j}$, a Xception model pre-trained on the CSU-RESISC10 is used to perform a visual information coding thereto, the $p_{i,j}$ then is converted into a The experimental results show that due to the complexity of scenes, a single remote sensing image cannot well distinguish commercial, industrial, residential and institutional lands. For the three methods used for comparison, κ is less than 0.78. Since the spatial relationships of image are taken into consideration, compared with the three comparative experiments, relative improvements of Kappa by the method of the embodiment of the invention are 10.1%, 10.3% and 8.8% respectively.

What is claimed is:

1. An urban remote sensing image scene classification method in consideration of spatial relationships, comprising:
   step 1, cutting a remote sensing image into sub-images in an even and non-overlapping manner;
   step 2, performing a visual information coding on each of the sub-images to obtain a feature image Fv;
   step 3, inputting the feature image Fv into a crossing transfer unit to obtain hierarchical spatial characteristics;
   step 4, performing convolution of dimensionality reduction on the hierarchical spatial characteristics to obtain dimensionality-reduced hierarchical spatial characteristics; and
   step 5, performing a softmax model based classification on the dimensionality-reduced hierarchical spatial characteristics to obtain a classification result;
   wherein the step 1 of cutting a remote sensing image into sub-images in an even and non-overlapping manner in the step 1 comprises that: a large-scale remote sensing image I with a size of M×N is sliding cut into m×n sub-images in the even and non-overlapping manner, each of the sub-images $P_{i,j}$ is with a size of $$\frac{M}{m} \times \frac{N}{n},$$

row and column numbers (i, j) of the $P_{i,j}$ in the I are stored as spatial information, where M, N, m and n are positive integers, $1 \leq i \leq m$, and $1 \leq j \leq n$;
   wherein the step 2 of performing a visual information coding on each of the sub-images to obtain a feature image Fv comprises that: a pre-trained deep convolution model is used to perform the visual information coding on each of the sub-images $P_{i,j}$ to convert the $P_{i,j}$ into a vector $fv_{i,j}$, and thereby the large-scale remote sensing image I is converted into the feature image Fv:

$$Fv = \begin{pmatrix} fv_{1,1} & \cdots & fv_{1,n} \\ \vdots & \ddots & \vdots \\ fv_{m,1} & \cdots & fv_{m,n} \end{pmatrix};$$

wherein the crossing transfer unit is used for extraction and fusion of regional spatial relationship and long-range spatial relationship, an extraction formula of the regional spatial relationship is Fr=Conv(Fv)=Fv*W+b, where Fr represents spatial relationship as extracted for analysis, Conv( ) represents a convolution function, W represents a convolution kernel, B represents an offset, and * represents a convolution operation; and the long-range spatial relationship is extracted by a ReNet module based on a recurrent neural network.

2. The urban remote sensing image scene classification method as claimed in claim 1, wherein an input of the crossing transfer unit is the feature image Fv, and an output of the crossing transfer unit is the hierarchical spatial characteristics $F_E$; the crossing transfer unit uses three paths to extract relationships for analysis and transfer relationships, a first one of the three paths first extracts the regional spatial relationship of the Fv and then extracts the long-range spatial relationship, a second one of the three paths first extracts the long-range spatial relationship of the Fv and then extracts the regional spatial relationship, and a third one of the three paths is a shortcut to transfer the Fv directly to a tail end of the crossing transfer unit without additional processing; and the hierarchical spatial characteristics $F_E$ as output is expressed to be that:

$$F_E = \tanh(\text{ReNet}^2(\text{Conv}^1(Fv)) + \text{Conv}^2(\text{ReNet}^1(Fv)) + Fv)$$

where tanh represents a hyperbolic tangent function, $\text{ReNet}^1$ and $\text{ReNet}^2$ represent two different ReNet modules, and $\text{Conv}^1$ and $\text{Conv}^2$ represent two different convolution modules.

3. The urban remote sensing image scene classification method as claimed in claim 2, wherein in the step 3, the feature image passes through three crossing transfer units in series to obtain the hierarchical spatial characteristics $F_M$;
   in the step 4, a convolutional layer $\text{conv}_{1 \times 1}$ with a size of 1×1 is used for the convolution of dimensionality reduction;
   in the step 5, a softmax model is used for the classification, and the classification result $C_{i,j}$ for the $P_{i,j}$ is expressed as that:

$$C_{i,j} = \text{argmax}(\text{softmax}(\text{conv}_{1\times 1}(F_M)_{i,j}))$$

where argmax(x) represents a dimension corresponding to a maximum component of a vector x.

4. The urban remote sensing image scene classification method as claimed in claim 1, wherein in the step 3, the feature image passes through three crossing transfer units in series to obtain hierarchical spatial characteristics $F_M$;
   in the step 4, a convolutional layer $\text{conv}_{1 \times 1}$, with a size of 1×1 is used for the convolution of dimensionality reduction;
   in the step 5, a softmax model is used for the classification, and the classification result $C_{i,j}$ for the $P_{i,j}$ is expressed as that:

$$C_{i,j} = \text{argmax}(\text{softmax}(\text{conv}_{1\times 1}(F_M)_{i,j}))$$

where argmax(x) represents a dimension corresponding to a maximum component of a vector x.

5. The urban remote sensing image scene classification method as claimed in claim 1, wherein the ReNet module is used for extracting the long-range spatial relationship from four directions of up, down, left and right along rows and columns of pixels for analysis.

6. The urban remote sensing image scene classification method as claimed in claim 1, wherein in a training process of the softmax model, a loss function is cross-entropy loss, and a back-propagation method is used to optimize parameters of model.

* * * * *